United States Patent
Heo et al.

(10) Patent No.: US 8,794,377 B2
(45) Date of Patent: Aug. 5, 2014

(54) SILENCER FOR REDUCING ACOUSTIC NOISE OF FUEL CELL SYSTEM

(75) Inventors: Jin-seok Heo, Hwaseong-si (KR); Won-ho Lee, Suwon-si (KR); Young-jae Kim, Seoul (KR); Jong-rock Choi, Seoul (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 13/585,909

(22) Filed: Aug. 15, 2012

(65) Prior Publication Data

US 2013/0164643 A1    Jun. 27, 2013

(30) Foreign Application Priority Data

Dec. 23, 2011   (KR) .......................... 10-2011-0141704

(51) Int. Cl.
  *F01N 1/02*   (2006.01)
  *F01N 1/08*   (2006.01)
  *F01N 1/00*   (2006.01)

(52) U.S. Cl.
  CPC ...... *F01N 1/02* (2013.01); *F01N 1/089* (2013.01); *F01N 1/023* (2013.01)
  USPC ............................. 181/273; 181/276; 181/251

(58) Field of Classification Search
  CPC ............. F01N 1/02; F01N 1/08; F01N 1/089; F01N 1/023; H01M 8/04082; H01M 8/04; Y02E 60/523; Y02E 60/50
  USPC ......... 181/273, 276, 272, 269, 268, 266, 251, 181/250; 429/428
  See application file for complete search history.

(56) References Cited

U.S. PATENT DOCUMENTS

| | | | | |
|---|---|---|---|---|
| 2,184,891 A | * | 12/1939 | Bourne | 181/273 |
| 2,205,899 A | * | 6/1940 | Chipley | 181/269 |
| 2,337,299 A | * | 12/1943 | Noblitt et al. | 181/266 |
| 2,618,354 A | * | 11/1952 | Hedrick | 181/266 |
| 2,717,048 A | * | 9/1955 | Deremer | 181/282 |
| 2,950,777 A | * | 8/1960 | Deremer | 181/266 |
| 3,103,256 A | * | 9/1963 | Deremer | 181/266 |

(Continued)

FOREIGN PATENT DOCUMENTS

| | | | | | |
|---|---|---|---|---|---|
| JP | 55049501 A | * | 4/1980 | | F01C 1/02 |
| JP | 61038114 A | * | 2/1986 | | F01N 1/08 |

(Continued)

OTHER PUBLICATIONS

Extended European Search Report for Application No. 12188416.7-1359 dated May 7, 2013.

*Primary Examiner* — Edgardo San Martin
(74) *Attorney, Agent, or Firm* — Cantor Colburn LLP

(57) ABSTRACT

A silencer installed in a fuel cell system includes a plurality of expansion chambers connected to a predetermined apparatus of the fuel cell system, wherein the plurality of expansion chambers serially reduces acoustic noise of air discharged from the predetermined apparatus and a resonator connected to an expansion chamber of the plurality of expansion chambers, wherein the resonator reduces acoustic noise received from the expansion chamber in another frequency band, which is different from a frequency band of the acoustic noise reduced by the plurality of expansion chambers, where one of the plurality of expansion chambers comprises an inlet pipe which receives air from the predetermined apparatus, another of the plurality of expansion chambers comprises an outlet pipe which discharges air flowed into the plurality of expansion chambers, and an intermediate pipe is disposed between the plurality of expansion chambers.

9 Claims, 10 Drawing Sheets

(56) References Cited

U.S. PATENT DOCUMENTS

| | | | | |
|---|---|---|---|---|
| 3,107,748 A | * | 10/1963 | Arthur et al. | 181/245 |
| 3,289,786 A | * | 12/1966 | Powers | 181/266 |
| 3,388,768 A | * | 6/1968 | Heath et al. | 181/266 |
| 3,434,565 A | * | 3/1969 | Fischer | 181/250 |
| 3,469,653 A | * | 9/1969 | Vautaw et al. | 181/266 |
| 3,512,607 A | * | 5/1970 | Hubbell | 181/265 |
| 3,724,591 A | * | 4/1973 | Malkiewicz | 181/265 |
| 3,807,527 A | * | 4/1974 | Bergson et al. | 181/232 |
| 4,064,962 A | * | 12/1977 | Hunt | 181/272 |
| 4,124,092 A | * | 11/1978 | Kajiya et al. | 181/265 |
| 4,209,076 A | * | 6/1980 | Franco et al. | 181/272 |
| 4,342,373 A | * | 8/1982 | Erickson et al. | 181/266 |
| 4,416,350 A | * | 11/1983 | Hayashi | 181/272 |
| 4,809,812 A | * | 3/1989 | Flugger | 181/268 |
| 4,846,302 A | * | 7/1989 | Hetherington | 181/243 |
| 5,783,782 A | * | 7/1998 | Sterrett et al. | 181/272 |
| 2002/0012826 A1 | | 1/2002 | Sohmer | |

FOREIGN PATENT DOCUMENTS

| | | | | |
|---|---|---|---|---|
| JP | 03246312 A | * | 11/1991 | F01N 1/02 |
| JP | 2004186118 A | | 7/2004 | |
| JP | 2005011640 A | | 1/2005 | |
| JP | 2005-116353 A | | 4/2005 | |
| JP | 2007205275 A | | 8/2007 | |
| JP | 2010101219 A | | 5/2010 | |
| KR | 1020070079534 A | | 8/2007 | |
| KR | 1020080056052 A | | 6/2008 | |
| KR | 1020090049666 A | | 5/2009 | |
| KR | 1020110012921 A | | 2/2011 | |

* cited by examiner

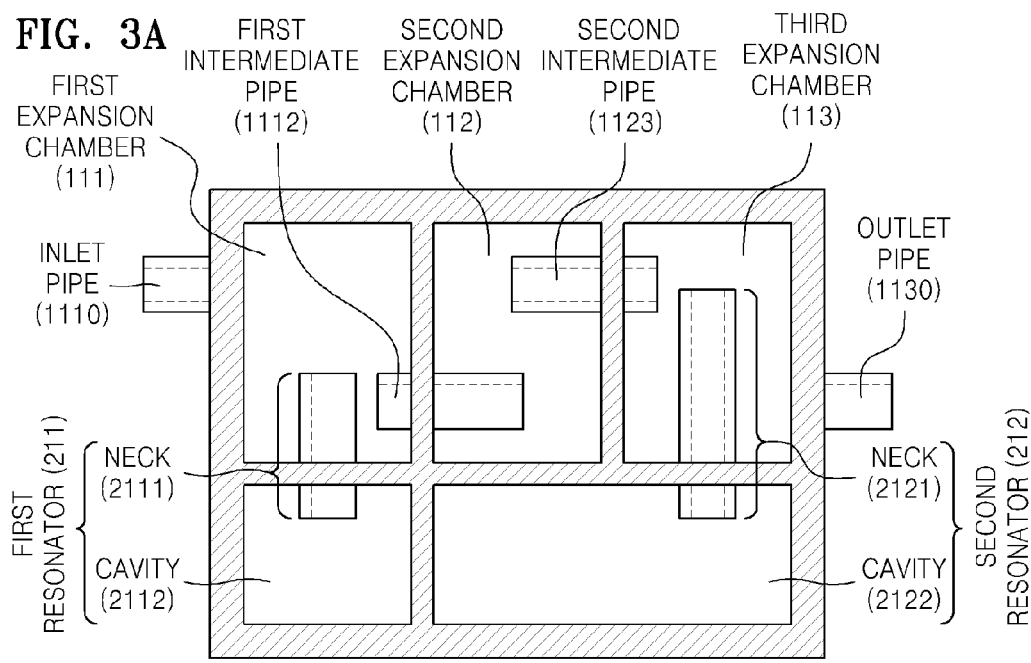
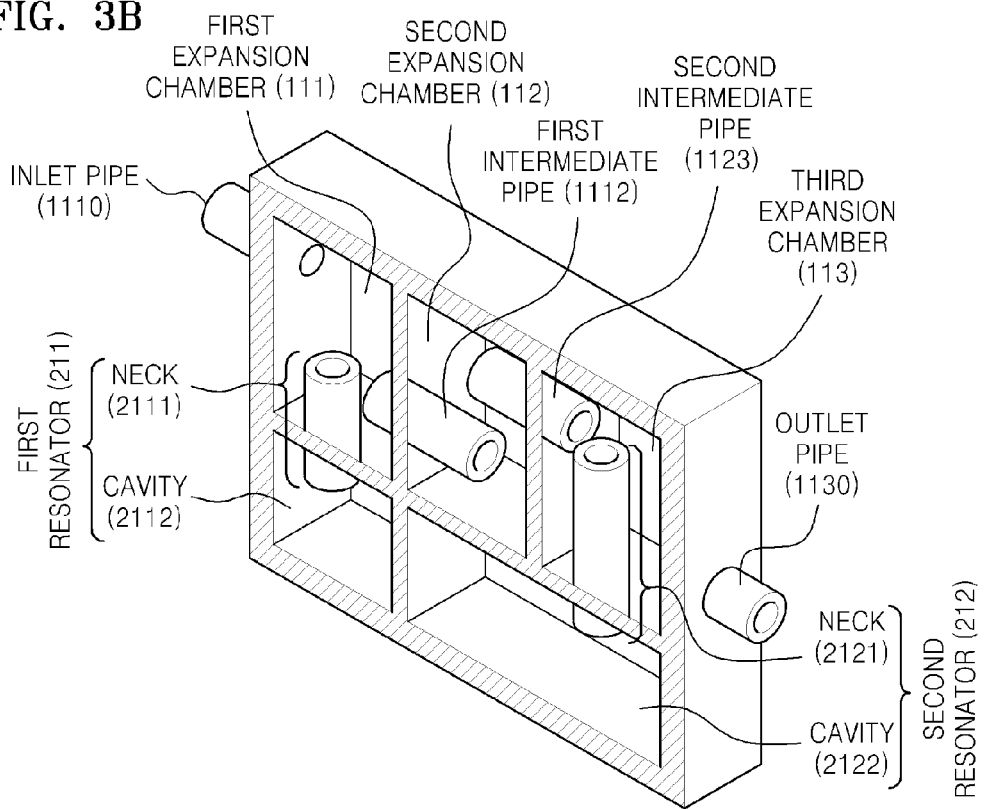

SILENCER FOR REDUCING ACOUSTIC NOISE OF FUEL CELL SYSTEM

CROSS-REFERENCE TO RELATED APPLICATIONS

This application claims priority to Korean Patent Application No. 10-2011-0141704, filed on Dec. 23, 2011, and all the benefits accruing therefrom under 35 U.S.C. §119, the content of which in its entirety is incorporated by reference.

BACKGROUND

1. Field

The present disclosure relates to a fuel cell system, and more particularly, to a silencer for reducing acoustic noise of a fuel cell system.

2. Description of the Related Art

A fuel cell is an environmentally friendly alternative energy technology that generates electric energy from a material that abundantly exists on earth, such as hydrogen, and has been drawing attention along with solar cells, or the like. In a fuel cell, a fuel, water and air are supplied to the fuel cell to generate power therein. Accordingly, several mechanical devices for supplying such materials are employed in a fuel cell system, and acoustic noise is generated while driving the mechanical devices. Since, if the acoustic noise of the fuel cell system is too loud, it may be unpleasant for a user and other people nearby, apparatuses for reducing the acoustic noise generated in the fuel cell system are being developed.

SUMMARY

Provided is a silencer which reduces acoustic noise in a predetermined frequency band generated in a fuel cell system, where the silencer has a reduced size to be installed in an internal space of a fuel cell system.

Provided is a fuel cell system in which the silencer is installed.

Additional aspects will be set forth in part in the description which follows and, in part, will be apparent from the description, or may be learned by practice of the embodiments described herein.

According to an embodiment of the invention, a silencer installed in a fuel cell system includes a plurality of expansion chambers connected to a predetermined apparatus of the fuel cell system, wherein the plurality of expansion chambers serially reduces acoustic noise of air discharged from the predetermined apparatus and a resonator connected to an expansion chamber of the plurality of expansion chambers, wherein the resonator reduces acoustic noise received from the expansion chamber in another frequency band, which is different from a frequency band of the acoustic noise reduced by the plurality of expansion chambers, where one of the plurality of expansion chambers comprises an inlet pipe which receives air from the predetermined apparatus, another of the plurality of expansion chambers comprises an outlet pipe which discharges air flowed into the plurality of expansion chambers, and an intermediate pipe is disposed between the plurality of expansion chambers.

In an embodiment, the plurality of expansion chambers and a cavity of the resonator may be defined by a plurality of partitions which divides an inner space of the silencer.

In an embodiment, a cavity of a first resonator of the resonator may share the plurality of partitions with a first group of the plurality of expansion chambers, a cavity of a second resonator of the resonator may share the plurality of partitions with a second group of the plurality of expansion chambers, and a number of the plurality of expansion chambers in the second group may be greater than a number of at least one expansion chamber in the first group.

In an embodiment, a number of the plurality of partitions may be substantially proportional to a sum of a number of the plurality of expansion chambers and a number of the cavity of the resonator.

In an embodiment, a volume of the cavity may be substantially inversely proportional to a size of a center frequency of the another frequency band.

In an embodiment, a first intermediate pipe may extend through a first partition between a first expansion chamber and a second expansion chamber of the plurality of expansion chambers, a second intermediate pipe may extend through a second partition between the second expansion chamber and a third expansion chamber of the plurality of expansion chambers, an end of an outlet of the first intermediate pipe may be disposed closer to the second partition than an end of an inlet of the second intermediate pipe such that air discharged from the outlet of the first intermediate pipe into the second expansion chamber flows into the inlet of the second intermediate pipe in a backflow form.

In an embodiment, a neck of the resonator may protrude into the expansion chamber connected to the resonator such that internal air of the expansion chamber connected to the resonator flows into a hole of the neck of the resonator and the air flowed into the hole of the neck of the resonator is discharged into the expansion chamber connected to the resonator from the hole of the neck of the resonator.

In an embodiment, a length of a neck of the resonator may be substantially inversely proportional to a size of a center frequency of the anther frequency band which is different from the frequency band of the acoustic noise reduced by the plurality of expansion chambers, and a size of a cross-section of the neck of each resonator may be substantially proportional to the size of the center frequency of the another frequency band which is different from the frequency band of the acoustic noise reduced by the plurality of expansion chambers.

In an embodiment, the predetermined apparatus may be an air pump which supplies air to a fuel cell of the fuel cell system, and the outlet pipe may be connected to an inlet at a cathode of the fuel cell of the fuel cell system such that air discharged from the outlet pipe flows into the inlet at the cathode of the fuel cell.

According to another embodiment of the invention, a fuel cell system includes: a fuel cell for generating power using a fuel; a balance of plants ("BOP") which supplies the fuel and air to the fuel cell; and a silencer disposed between an air pump of the BOP and an inlet at a cathode of the fuel cell, where the silencer reduce acoustic noise of air discharged from the air pump.

In an embodiment, the silencer may include a plurality of expansion chambers which serially reduces the acoustic noise of the air discharged from the air pump. The silencer may further include a resonator connected to an expansion chamber of the plurality of expansion chambers, where the resonator reduces acoustic noise of air received from the expansion chamber in another frequency band which is different from a frequency band of the acoustic noise reduced by the plurality of expansion chambers.

In an embodiment, first rubber packing may be disposed between the air pump and a holder of the air pump, and second rubber packing may be disposed between the holder and an inner frame of the fuel cell system. A hardness of the first rubber packing may be higher than a hardness of the second rubber packing.

BRIEF DESCRIPTION OF THE DRAWINGS

These and/or other features will become apparent and more readily appreciated from the following description of the embodiments, taken in conjunction with the accompanying drawings of which:

FIGS. 3A and 3B are diagrams of an internal shape of an embodiment of a silencer according to the invention;

DETAILED DESCRIPTION

Figure 1:
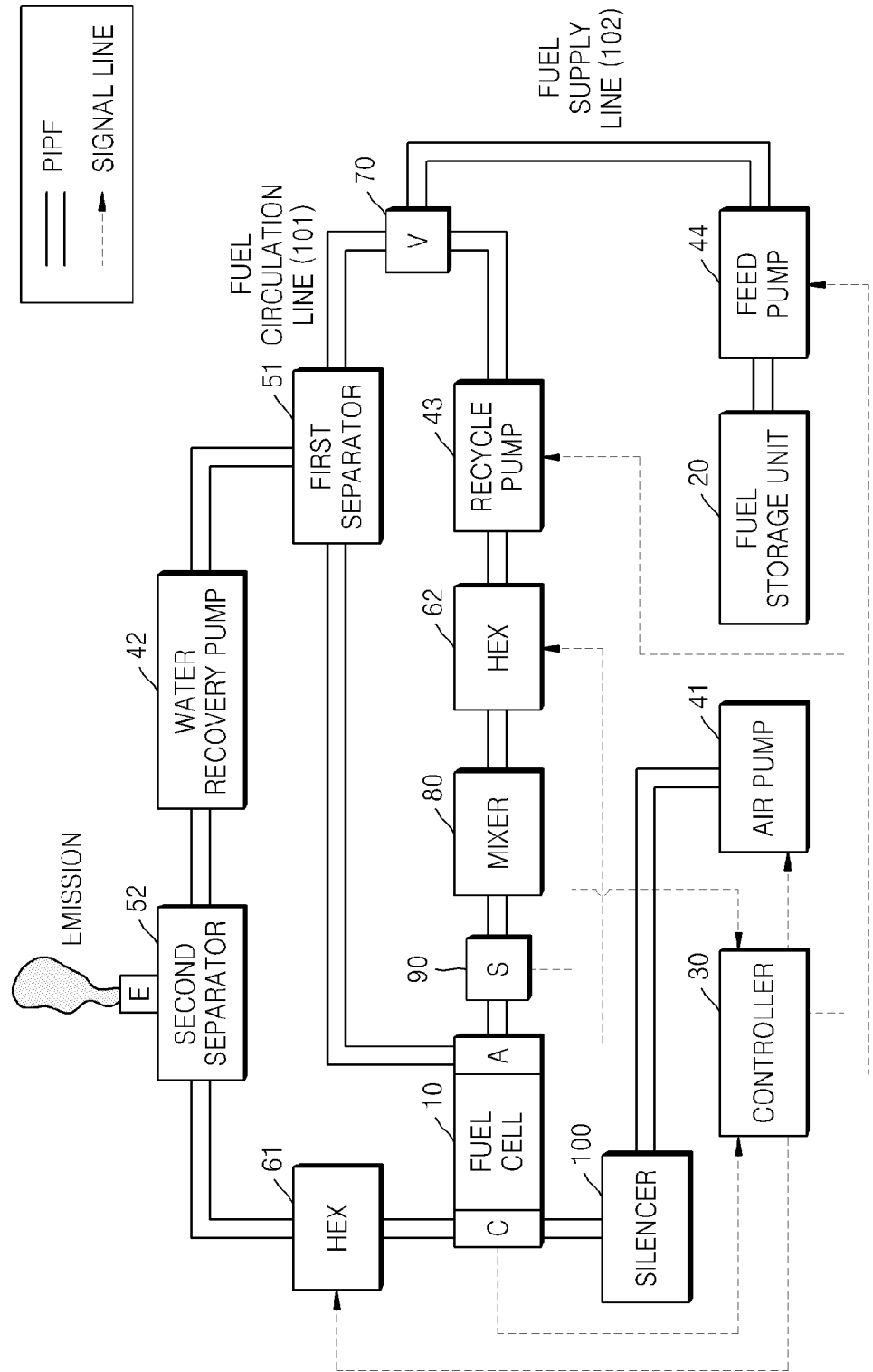
FIG. 1 is a block diagram showing an embodiment of a fuel cell system according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described in further detail with reference to the accompanying drawings.

Reference will now be made in detail to embodiments, examples of which are illustrated in the accompanying drawings. A fuel cell system generally includes a fuel cell for generating power, a balance of plants ("BOP") constituting peripheral devices of the fuel cell for supplying a fuel, water and air to the fuel cell, and a converter for converting and supplying the power output from the fuel cell to a load. Since embodiments of the invention are related to a silencer for reducing acoustic noise of air flowing inside a fuel cell system, detailed description of other elements of the fuel cell system, e.g., a stack forming a fuel cell, a BOP and a converter, will be omitted herein. Generally, a fuel cell is designed in a stack shape in which a plurality of cells are combined in series or in parallel, according to power requested by a load. Hereinafter, both one cell and a stack in which a plurality of cells are combined are simply referred to as a fuel cell.

FIG. 1 is a block diagram showing an embodiment of a fuel cell system according to the invention. Referring to FIG. 1, an embodiment of the fuel cell system includes a fuel cell 10, a fuel storage unit 20, a controller 30, an air pump 41, a water recovery pump 42, a recycle pump 43, a feed pump 44, a first separator 51, a second separator 52, a first heat exchanger 61, a second heat exchanger ("HEX") 62, a valve module ("V") 70, a mixer 80, a sensor 90 ("S") and a silencer 100. In an embodiment, elements for supplying a fuel, water, air, or the like, to the fuel cell 10, e.g., elements described above other than the fuel cell 10, are referred to as a BOP. In an embodiment, as shown in FIG. 1, several pipes connecting elements of the BOP are provided between the elements of the BOP. In such an embodiment, the fuel cell system may include elements other than those shown in FIG. 1. In an alternative embodiment, the fuel cell system may include a thermistor for detecting a temperature of the fuel cell 10 installed therein, a filter for removing impurities of a fuel flowing through a pipe connected to the sensor 90 or the like installed in the pipe, or a fan installed in the first and second heat exchangers 61 and 62 to cool down the first and second heat exchangers 61 and 62.

The fuel cell 10 is a power generating apparatus that generates direct current ("DC") power by converting chemical energy in a fuel to direct electrical energy by using an electrochemical reaction. In an embodiment, the fuel cell 10 may include a solid oxide fuel cell ("SOFC"), a polymer electrolyte membrane fuel cell ("PEMFC") or a direct methanol fuel cell ("DMFC"), for example. In one embodiment, as shown in FIG. 1, the fuel cell system is a fuel cell system to which a BOP for driving a DMFC is applied. However, a technical feature of reducing acoustic noise of the air pump 41 described below may also be applied to another type of fuel cell.

In an embodiment, unlike an embodiment including an indirect methanol fuel cell that reforms methanol to have increased hydrogen concentration, the DMFC generates hydrogen ions and electrons as methanol and water directly react with each other in an anode of the fuel cell 10 without reforming of methanol. In such an embodiment, the DMFC does not perform such a reforming process, and a size of the DMFC may be reduced and used in a portable fuel cell system.

In an anode of the DMFC, a reaction of $CH_3OH+H_2O \rightarrow 6H^+ +6e^- +CO_2$ is generated, and in a cathode, a reaction of $3/2O_2+6H^+ +6e^- \rightarrow 3H_2O$ is generated. A proton (H+) is transferred through a proton exchange membrane in the fuel cell 10, and an electron (e−) is transferred from an anode to a cathode through an external circuit. Power is generated through such processes. Specifically, a catalyst exists in the DMFC such that a reaction in the fuel cell 10 is efficiently performed. Generally, the catalyst includes platinum, and may be deteriorated when a temperature during the processes is too high. Accordingly, pure methanol is not supplied to the fuel cell, but methanol diluted by a suitable amount of water, e.g., a methanol aqueous solution having suitable concentration, is supplied to the fuel cell 10. Hereinafter, the methanol aqueous solution supplied to an inlet at the anode of the fuel cell 10 will be simply referred to as a fuel.

As described above, in an embodiment, suitable amounts of methanol, water and air are supplied to the fuel cell 10 such that the reaction in the fuel cell 10 is efficiently performed while effectively preventing deterioration of the fuel cell 10. The controller 30 controls the air pump 41, the feed pump 44, the recycle pump 43 and the water recovery pump 42 to adjust amounts of fuel, water and air supplied to the fuel cell 10 based on concentration, temperature, or the like of the fuel detected by the sensor 90. The fuel cell 10 generates power using a fuel having suitable concentration supplied from the mixer 80 to the inlet at the anode 'A' of the fuel cell 10. During a power generating process of the fuel cell 10, carbon dioxide and an unreacted fuel constituting by-products of the above reaction processes are discharged from an outlet at the anode of the fuel cell 10, and water constituting by-products of the above reaction processes are discharged from an outlet at the cathode 'C' of the fuel cell 10.

The first separator 51 recovers methanol and water by separating methanol and water from the by-products and the unreacted fuel discharged from the outlet at the anode of the fuel cell 10. The by-products discharged from the outlet at the cathode of the fuel cell 10 include moisture in vapor form as a high temperature fluid according to reaction heat in the fuel cell 10. The by-products are cooled down via a heat exchange process of the first heat exchanger 61 while passing through the first heat exchanger 61, and some water is recovered during such a process. The second separator 52 recovers water by separating water from such cooled down by-products, and externally discharges carbon dioxide constituting remaining by-products after such a recovery process. The first and second separators 51 and 52 may separate methanol and fuel from the by-products, and the unreacted fuel discharged from the fuel cell 10, via centrifugation, or the like. The water recovery pump 42 sucks the water recovered by the second separator 51 and discharges the sucked water to the first separator 51. Accordingly, the first separator 51 discharges a fuel having low concentration in which methanol recovered by the first separator 51 and water recovered by the first and second separators 51 and 52 are mixed.

The fuel storage unit 20 is a container for storing a fuel, and may have any shape, such as a cylindrical shape or a box shape, for example. In an embodiment, the fuel storage unit 20 may be configured such that a fuel is refilled. In an embodiment, the fuel storage unit 20 may be detachably attached to the fuel cell system of FIG. 1, and may be referred to as a cartridge. The fuel storage unit 20 stores a fuel having high concentration, for example, about 100% methanol.

In an embodiment, the valve module 70 may be provided at a point where a fuel circulation line 101 and a fuel supply line 102 are connected to control a flow of a low concentration fuel circulated through the fuel circulation line 101 and a flow of a high concentration fuel supplied from the fuel storage unit 20 to the fuel cell 10 through the fuel supply line 102. In such an embodiment, the fuel circulation line 101 denotes pipes in a path of an unreacted fuel discharged from the fuel cell 10 and flowing back to the fuel cell 10, and the fuel supply line 102 denotes pipes in a path of a newly supplied fuel from the fuel storage unit 20 to the fuel cell 10.

The recycle pump 43 sucks at least one of the low concentration fuel transferred from the valve module 70 through the fuel circulation line 101 and the high concentration fuel transferred from the valve module 70 through the fuel supply line 102 and discharges the sucked fuel to the mixer 80 through the second heat exchanger 62, based on a fuel flow control of the valve module 70. A temperature of the fuel discharged from the recycle pump 43 is adjusted by a heat exchange operation of the second heat exchanger 62 as the fuel passes through the second heat exchanger 62. The mixer 80 mixes the low concentration fuel and the high concentration fuel discharged from the recycle pump 43, and supplies a fuel having suitable concentration generated through such a mixing process to the fuel cell 10.

The first heat exchanger 61 controls a temperature of water discharged from the cathode of the fuel cell 10. In an embodiment, the first heat exchanger 61 is disposed at a predetermined point of a pipe line through which water discharged from the fuel cell 10 flows, for example, at the outlet at the cathode of the fuel cell 10. The second heat exchanger 62 controls a temperature of the fuel supplied to the inlet at the anode of the fuel cell 10. In an embodiment, the second heat exchanger 62 is disposed at a predetermined point of a pipe line through which the fuel supplied to the fuel cell 10 flows, for example, between the recycle pump 43 and the mixer 80. The first and second heat exchangers 61 and 62 may include a metal pipe, a tank, or the like such that a fluid flowing inside a pipe of the fuel cell system and a medium outside the pipe effectively exchange heat.

In an embodiment, several mechanical devices, such as pumps and separators as described above, are driven in the fuel cell system to generate power in the fuel cell 10, and acoustic noise may be generated while driving the mechanical devices. If acoustic noise of the fuel cell system is too loud, it may be unpleasant for a user and other people nearby. Accordingly, in an embodiment, loud acoustic noise of the fuel cell system is effectively reduced. In an embodiment, where acoustic noise of the fuel cell system is not substantially loud, acoustic noise in a predetermined frequency band is reduced according to circumstances. In an embodiment, for example, where the fuel cell system is employed in a military device, acoustic noise having a sound pressure level in an about ⅓ octave band unit in a frequency band from about 50 hertz (Hz) to about 10 kilohertz (kHz) at a location 10 m away from the military device is allowed to effectively prevent the military device from being exposed to an enemy due to its acoustic noise.

In an embodiment, the air pump 41 may include a pump chamber having an inlet for receiving external air and an outlet for discharging air, a motor that rotates based on a control signal output from the controller 30, and a diaphragm that repeats an operation of contracting and expanding a space within the pump chamber corresponding to a rotation of the motor. The air pump 41 may supply air to the inlet at the cathode of the fuel cell 10 by sucking external air using a fluctuation pressure due to the diaphragm repeating the operation of contracting and expanding. Acoustic noise of the air pump 41 may be classified into acoustic noise generated by self-vibration of the air pump 41, and acoustic noise generated as air inside the air pump 41 collides with an object, such as an inner wall of the pump chamber, while moving at a predetermined speed.

When a rotation frequency of the motor of the air pump 41 is about 80 Hz and one rotation of the motor vibrates the diaphragm four times, a vibration frequency of the diaphragm is about 320 Hz. As such, when the diaphragm of the air pump 41 vibrates at about 320 Hz, the vibration causes the air pump 41 to vibrate and the internal air of the air pump 41 to collide with an inner wall of the air pump 41, and as a result, acoustic noise may be generated in a frequency band of about 500 Hz to about 2 kHz. In an embodiment, as shown in FIG. 1, where the fuel cell system is a portable fuel cell system employing a DMFC, an inner space of the fuel cell system is relatively small. Hereinafter, a silencer that reduces acoustic noise in a predetermined frequency band generated in the air pump 41 of the fuel cell system, in such a small volume, will be referred to as a silencer having a small volume to be installed in an inner space of a fuel cell system. In an embodiment, the silencer, which will be described below in detail, is used to reduce the acoustic noise generated in the air pump 41, but not being limited thereto or thereby. In an embodiment, the silencer may be used to reduce acoustic noise generated in another element of the fuel cell system of FIG. 1.

Figure 2A:
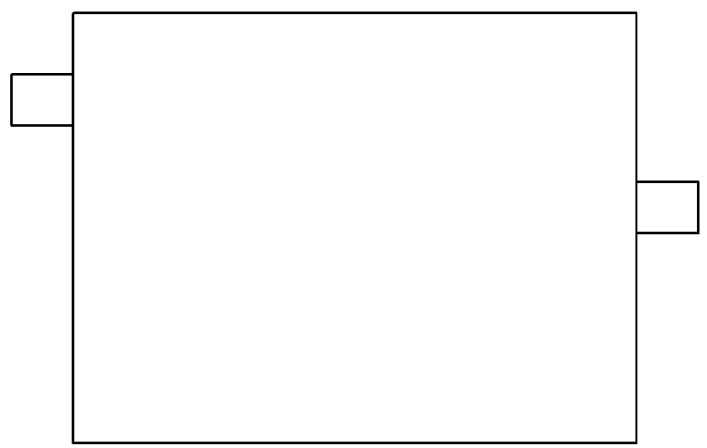
FIGS. 2A through 2D are diagrams of an external shape of an embodiment of a silencer according to the invention.
Figure 2B:
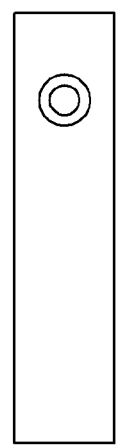
Figure 2C:
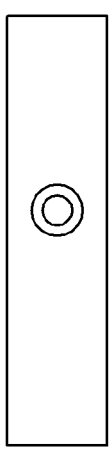
Figure 2D:
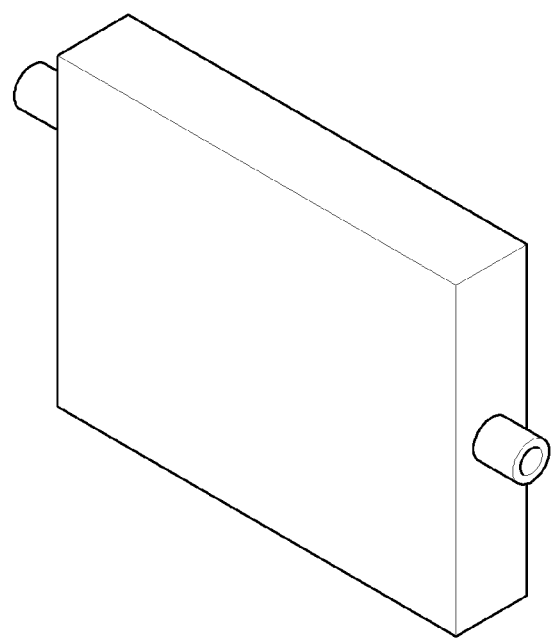

FIGS. 2A through 2D are views of an external shape of an embodiment of the silencer 100 according to the invention. FIG. 2A is a front view of the external shape of the silencer 100, FIG. 2B is a left view of the external shape of the silencer 100, FIG. 2C is a right view of the external shape of the silencer 100, and FIG. 2D is a perspective view of the external shape of the silencer 100. In an embodiment, as shown in FIGS. 2A through 2D, the silencer 100 is in a box shape, but not being limited thereto. In an alternative embodiment, the silencer 100 may have any shape, such as a cylindrical shape. In an embodiment, where the fuel cell system has a box shape and peripheral devices in the fuel cell system also have box shapes, the silencer 100 have a box shape such that utility of an inner space of the fuel cell system is improved.

FIGS. 3A and 3B are diagrams of an internal shape of an embodiment of the silencer 100 according to the invention. FIG. 3A is a front view of the internal shape of the silencer 100, and FIG. 3B is a perspective view of the internal shape of the silencer 100. Referring to FIGS. 3A and 3B, the silencer 100 includes an expansion chamber, e.g., first through third expansion chambers 111 through 113, and a resonator, e.g., first and second resonators 211 and 212. The first expansion chamber 111 includes an inlet pipe 1110 for receiving air from an apparatus, for example, the air pump 41, which discharges air from the fuel cell system of FIG. 1 by being connected to the air pump 41. The third expansion chamber 113 includes an outlet pipe 1130 for discharging air that has flowed into the first through third expansion chambers 111 through 113. The outlet pipe 1130 is connected to an apparatus for sucking air from the fuel cell system of FIG. 1, for example, the inlet at the cathode of the fuel cell 10, and thus air discharged from the outlet pipe 1130 flows into the inlet at the cathode of the fuel cell 10. In an embodiment, first and second intermediate pipes 1112 and 1123 are disposed between the first through third expansion chambers 111 through 113 to connect the first through third expansion chambers 111 through 113 to each other.

Generally, in an expansion silencer, some sound waves incident on the expansion silencer are reflected and remaining sound waves proceed to an expansion chamber due to a difference between a cross-section of an inlet pipe and a cross-section of the expansion chamber, and then some of the sound waves that proceeded to the expansion chamber are reflected and remaining sound waves proceed to an outlet pipe due to a difference between the cross-section of the expansion chamber and a cross-section of the outlet pipe. As such, acoustic noise is reduced by the expansion silencer as some sound waves incident on the expansion silencer are reflected. If A1 denotes the cross-section of the inlet and outlet pipes of the expansion silencer, A2 denotes the cross-section of the expansion chamber, and L denotes a length of the expansion chamber, a transmission loss of the expansion silencer may be calculated from Equation 1 below. In Equation 1, 'f' denotes a target frequency of acoustic noise to be reduced by the expansion silencer, and 'c' denotes a sound speed.

$$TL = 10\ \log\left[1 + \frac{1}{4}\left(m - \frac{1}{m}\right)^2 \sin^2 KL\right] \text{dB}, \quad \text{[Equation 1]}$$

$$m = \frac{A_2}{A_1},\ K = \frac{2\pi f}{c}$$

As shown in Equation 1, the transmission loss of the expansion silencer is maximum when a ratio of the cross-section of the inlet and outlet pipes of the expansion silencer and the cross-section of the expansion chamber is high and KL is nπ/2 (n=1, 3, 5, ... ), that is, when L is nc/4f (n=1, 3, 5, ... ). The silencer 100 of FIGS. 3A and 3B is installed in a remaining space of a space occupied by elements other than the silencer 100 from among an entire inner space of the fuel cell system. As such, since the silencer 100 shown in FIGS. 3A and 3B is allowed to have a volume less than or equal to a volume of the remaining space, increasing the ratio of the cross-section of the inlet and outlet pipes of the expansion silencer and the cross-section of the expansion chamber may be limited. Accordingly, an embodiment of the silencer 100 includes the first through third expansion chambers 111 through 113 for serially reducing acoustic noise of air discharged from the air pump 41, such that the transmission loss increase in the limited space. The first through third expansion chambers 111 through 113 enables a sound reflection due to the difference between the cross-section of the inlet and outlet pipes of the expansion silencer and the cross-section of the expansion chamber to be serially generated a plurality of times, such that a high transmission loss occurs in a limited space.

As such, when a plurality of expansion chambers are employed, a length of each expansion chamber is reduced. Accordingly, a frequency band having a high transmission loss in each expansion chamber, that is, a frequency band where acoustic noise is reduced in each expansion chamber, is increased. In an embodiment, where acoustic noise is generated in a frequency band of about 500 Hz to about 2 kHz by the air pump 41, the first through third expansion chambers 111 through 113 may have a high acoustic noise reduction performance regarding acoustic noise in a frequency band equal to or higher than about 1.5 kHz, but have a low acoustic noise reduction performance regarding acoustic noise in a frequency band from about 500 Hz to about 1.5 kHz. In an embodiment, as shown in FIGS. 3A and 3B, the silencer 100 includes the first resonator 211 connected to the first expansion chamber 111 and the second resonator 212 connected to the third expansion chamber 113 to improve reduction of acoustic noise lower than or equal to a predetermined sound pressure level in a ⅓ octave band in a frequency band of about 500 Hz to about 2 kHz. The first resonator 211 reduces acoustic noise of air that has flowed into the first expansion chamber 111 in another frequency band different from a frequency band of acoustic noise reduced by the first through third expansion chambers 111 through 113. The second resonator 212 reduces acoustic noise of air that has flowed into the second expansion chamber 112 in another frequency band different from the frequency band of the acoustic noise reduced by the first through third expansion chambers 111 through 113.

In an embodiment, acoustic noise of air that has passed through the first through third expansion chambers 111 through 113 is measured and Fast Fourier Transform ("FFT") is performed on the measured acoustic noise in a ⅓ octave band unit such that a sound pressure level corresponding to frequencies in the ⅓ octave band unit may be detected. A designer of the silencer 100 may refer to results of the detecting to check frequencies having a sound pressure level that violates a target acoustic noise condition of the silencer 100, for example, a condition allowing only acoustic noise lower than or equal to the predetermined sound pressure level in the ⅓ octave band unit in the frequency band from about 50 Hz to about 10 kHz. Then, the designer may determine target frequencies to be reduced again with respect to acoustic noise of air that has passed through the first through third expansion chambers 111 through 113 by referring to the frequencies having the sound pressure level violating the acoustic noise condition.

In an alternative embodiment, the first through third expansion chambers 111 through 113 may be modeled using Equation 1 above, and a sound pressure level corresponding to the frequencies in the ⅓ octave band unit of the air that has passed through the first through third expansion chambers 111 through 113 from the models of the first through third expansion chambers 111 through 113 may be predicted. The designer may determine the target frequencies to be reduced again with respect to the acoustic noise of the air that has passed through the first through third expansion chambers 111 through 113 by referring to results of such predicting. In one embodiment, for example, if the frequencies having the sound pressure level violating the acoustic noise condition are classified into a frequency band around 1 kHz and a frequency band around 2 kHz, center frequencies of frequency bands reduced by the first and second resonators 211 and 212 may be determined to be 1 kHz and 2 kHz.

In an embodiment, a resonator has a structure of generating sound waves of a resonant frequency as air that has flowed into the resonator acts as a spring. Sound waves of a reverse phase reflected by the resonator cancel out sound waves in the same resonant frequency as the reflected waves. In an embodiment, a resonator includes a Helmholtz resonator, for example. When V denotes a volume of a cavity of a Helmholtz resonator, L denotes a length of a neck of the Helmholtz resonator, and A denotes a cross-section of the neck, a resonant frequency of the Helmholtz resonator may be calculated based on Equation 2 below. In Equation 2, c denotes a sound speed.

$$f = \frac{c}{2\pi}\sqrt{\frac{A}{VL}}\ \text{Hz} \quad \text{[Equation 2]}$$

As shown in Equation 2, the resonant frequency of the Helmholtz resonator is determined by the volume of the cavity, the length of the neck, and the cross-section of the neck, and the resonant frequency is not affected by a shape of the Helmholtz resonator. In an embodiment, as shown in FIGS. 3A and 3B, the first and second resonators 211 and 212 are Helmholtz resonators, where the first resonator 211 includes a neck 2111 protruding inside the first expansion chamber 111 and a cavity 2112, and the second resonator 212 includes a neck 2121 protruding inside the third expansion chamber 113 and a cavity 2122.

In such an embodiment, the neck 2111 of the first resonator 211 protrudes inside the first expansion chamber 111 such that internal air of the first expansion chamber 111 connected to the first resonator 211 flows into a hole of the neck 2111 of the first resonator 211, and the air is then discharged from the hole of the neck 2111 of the first resonator 211 into the first expansion chamber 111 connected to the first resonator 211. In such an embodiment, the neck 2121 of the second resonator 212 protrudes inside the third expansion chamber 113 such that internal air of the third expansion chamber 113 connected to the second resonator 212 flows into a hole of the neck 2121 of the second resonator 212, and the air is thereby discharged from the hole of the neck 2121 of the second resonator 212 into the third expansion chamber 113 connected to the second resonator 212.

As shown in Equation 2, the length of the neck 2111 of the first resonator 211 and the volume of the cavity 2112 are inversely proportional to a size of the center frequency of the frequency band to be reduced by the first resonator 211, e.g., a size of the center frequency of the another frequency band that is different from the frequency band of the acoustic noise reduced in the first through third expansion chambers 111 through 113, and the size of the cross-section of the neck 2111 of the first resonator 211 is proportional to the size of the center frequency of the frequency band to be reduced by the first resonator 211. Similarly, the length of the neck 2121 of the second resonator 212 and the volume of the cavity 2122 are inversely proportional to a size of the center frequency of the frequency band to be reduced by the second resonator, e.g., a size of the center frequency of the another frequency band that is different from the frequency band of the acoustic noise reduced by the first through third expansion chambers 111 through 113, and the size of the cross-section of the neck 2121 of the second resonator 212 is proportional to the size of the center frequency of the frequency band to be reduced by the second resonator 212.

Accordingly, in such an embodiment, the designer of the silencer 100 may adjust the length and cross-section of the neck 2111 of the first resonator 211 and the volume of the cavity 2112 to realize a resonator having a frequency selected by the designer, for example a resonant frequency of 2 kHz. Similarly, the designer of the silencer 100 may adjust the length and cross-section of the neck 2121 of the second resonator 212 and the volume of the cavity 2122 to realize a resonator having a frequency selected by the designer, for example, a resonant frequency of 1 kHz. In an embodiment, where the length of the neck 2111 of the first resonator 211 is about 6 millimeters (mm), an internal diameter of the neck 2111 is about 2 mm, and the volume of the cavity 2112 is about 411 cubic millimeters ($mm^3$), the first resonator 211 has a resonant frequency of about 1931 Hz. In an embodiment, where the length of the neck 2121 of the second resonator 212 is about 10 mm, an internal diameter of the neck 2121 is about 2 mm, and the volume of the cavity 2122 is about 912 $mm^3$, the second resonator 212 has a resonant frequency of about 1004 Hz.

As described above, in an embodiment, the fuel cell system of FIG. 1 is a portable small fuel cell system, and thus the silencer 100 of FIGS. 3A and 3B is installed in a space left after installing other elements of the fuel cell system. In such an embodiment, the size of the silencer 100 is effectively reduced. In such an embodiment, as internal volumes of the first through third expansion chambers 111 through 113 increase, transmission losses are increased, that is, to increase volumes of the first through third expansion chambers within a space allowed in the silencer 100 of FIGS. 3A and 3B, the first through third expansion chambers 111 through 113 and the cavities 2112 and 2122 of the first and second resonators 211 and 212 are formed such that there is no idle space in the inner space of the silencer 100. Referring to FIGS. 3A and 3B, the first through third expansion chambers 111 through 113 and the cavities 2112 and 2122 of the first and second resonators 211 and 212 are defined by a plurality of partitions which divides the inner space of the silencer 100.

In an embodiment, the first through third expansion chambers 111 through 113 and the cavities 2112 and 2122 of the first and second resonators 211 and 212 are in spaces defined by the plurality of partitions that divides the inner space of the silencer 100, and the first through third expansion chambers 111 through 113 and the cavities 2112 and 2122 share the partitions, and as a result, there is no idle space in the inner space of the silencer 100. In such an embodiment, the number of partitions is proportional to a sum of the number of first through third expansion chambers 111 through 113 and the number of cavities 2112 and 2122 of the first and second resonators 211 and 212. In such an embodiment, the number of partitions increase as the numbers of first through third expansion chambers 111 through 113 and cavities 2112 and 2122 of the first and second resonators 211 and 212 increase. In an embodiment of the silencer 100, as show in FIGS. 3A and 3B, six partitions are used to form three expansion chambers and two cavities, but not being limited thereto.

As described above, a target resonant frequency of the second resonator 212 is about half of a target resonant frequency of the first resonator 211. A resonant frequency of a resonator may be adjusted by adjusting a length and a cross-section of a neck of the resonator. In an embodiment, the first and second resonators 211 and 212 having the target resonant frequencies may be obtained when the volume of the cavity 2122 of the second resonator 212 is about twice the volume of the cavity 2112 of the first resonator 211. In an embodiment, the cavity of the resonator, e.g., each of the cavity 2112 of the first resonator 211 and the cavity 2122 of the second resonator 212, shares the plurality of partitions with a group of the expansion chambers, e.g., the first through third expansion chambers. Referring to FIGS. 3A and 3B, in an embodiment, the cavity 2112 of the first resonator 211 shares one partition with a first group of expansion chambers, e.g., the first expansion chamber 111, and the cavity 2122 of the second resonator 212 shares two partitions with a second group of the expansion chambers, e.g., the second and third expansion chambers 112 and 113. As such, when the shapes and volumes of the first through third expansion chambers 111 through 113 are substantially the same, the cavity 2112 of the first resonator 211 may share one partition with the first expansion chamber 111 and the cavity 2122 of the second resonator 212 may share two partitions with the second and third expansion chambers 112 and 113, and thus the volume of the cavity 2122 of the second resonator 212 may be about twice the volume of the cavity 2112 of the first resonator 211.

Referring to FIGS. 3A and 3B, an inlet of the first intermediate pipe 1112 extending through, e.g., inserted, in the partition between the first and second expansion chambers 111 and 112 is located inside the first expansion chamber 111, and an outlet of the first intermediate pipe 1112 is located inside the second expansion chamber 112. An inlet of the second intermediate pipe 1123 extending through the partition between the second and third expansion chambers 112 and 113 is located inside the second expansion chamber 112 and an outlet of the second intermediate pipe 1123 is located inside the third expansion chamber 113. Accordingly, the outlet of the first intermediate pipe 1112 and the inlet of the second intermediate pipe 1123 are located inside the second expansion chamber 112. In an embodiment, as shown in FIG. 3, to reduce acoustic noise of air flowing inside the second expansion chamber 112, the designer of the silencer 100 may adjust the lengths of the first and second intermediate pipes 1112 and 1123 such that an end of the outlet of the first intermediate pipe 1112 is located closer to the partition between the second and third expansion chambers 112 and 113 than an end of the inlet of the second intermediate pipe 1123.

In such an embodiment, the end of the outlet of the first intermediate pipe 1112 is located closer to the partition between the second and third expansion chambers 112 and 113 than the end of the inlet of the second intermediate pipe 1123 such that air discharged from the outlet of the first intermediate pipe 1112 into the second expansion chamber 112 back flows to the inlet of the second intermediate pipe 1123. The air discharged from the outlet of the first intermediate pipe 1112 into the second expansion chamber 112 moves in a forward direction and then moves backward after being reflected at the partition between the second and third expansion chambers 112 and 113. Then, the air moving in such a backward direction is reflected at the partition between the first and second expansion chambers 111 and 112 and thereby moves in the forward direction again. In an embodiment, where the lengths of the first and second intermediate pipes 1112 and 1123 are adjusted for the air in the forward direction and the air in the backward direction to have opposite phases or phases close to opposite phases inside the second expansion chamber 112, sound pressure of the air in the forward direction and sound pressure of the air in the backward direction are counterbalanced, and thereby effectively reduced.

Figure 4:
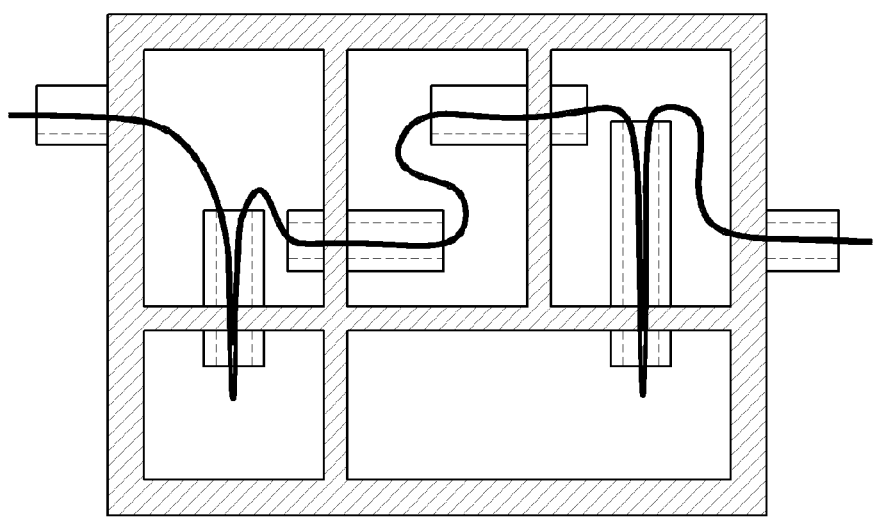
FIG. 4 is a diagram showing a flow of air in an embodiment of a silencer, according to the invention.

FIG. 4 is a diagram showing a flow of air in an embodiment of the silencer 100 according to the invention. Referring to FIG. 4, the air flows into the first expansion chamber 111 through the inlet pipe 1110, the air inside the first expansion chamber 111 flows to the hole of the neck 2111 of the first resonator 211, and then the air is again discharged from the hole of the neck 2111 of the first resonator 211 into the first expansion chamber 111. The air inside the first expansion chamber 111 flows into the second expansion chamber 112 through the first intermediate pipe 1112, and then the air moves in the forward direction and then in the backward direction by being reflected at the partition between the second and third expansion chambers 112 and 113. The air moving in the backward direction is reflected at the partition between the first and second expansion chambers 111 and 112 to move in the forward direction again, and then flows into the third expansion chamber 113 through the second intermediate pipe 1123. The internal air of the third expansion chamber 113 flows to the hole of the neck 2121 of the second resonator 212, and then is discharged into the third expansion chamber 113 again from the hole of the neck 2121 of the second resonator 212.

Figure 5A:
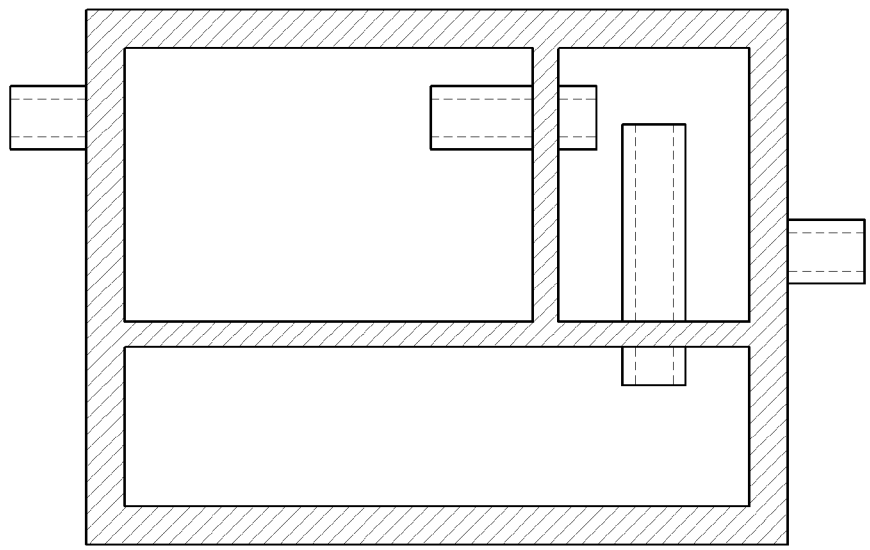
FIGS. 5A and 5B are diagrams of an internal shape of an alternative embodiment of a silencer according to the invention.
Figure 5B:
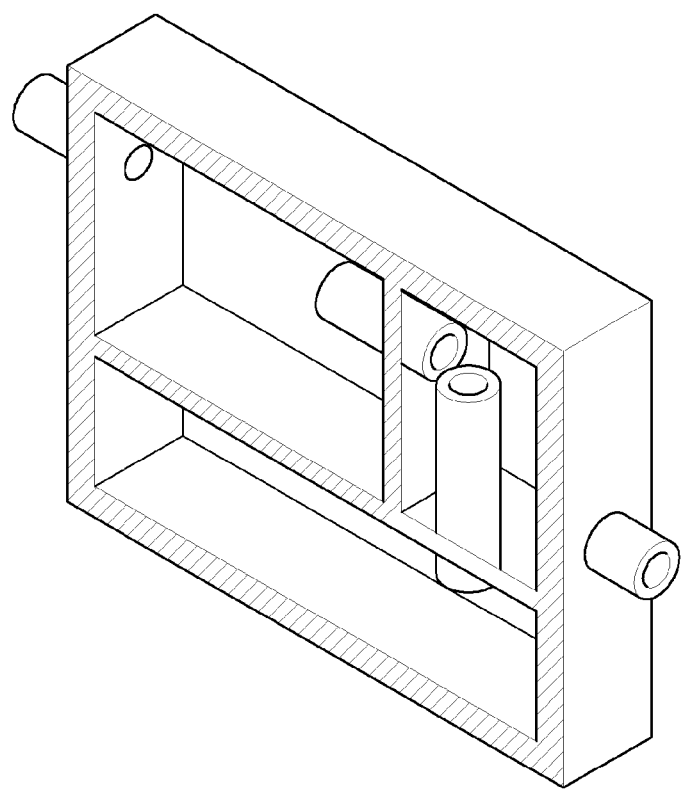

FIGS. 5A and 5B are diagrams of an internal shape of an alternative embodiment of the silencer 100 according to the invention. Referring to FIGS. 5A and 5B, the silencer 100 includes two expansion chambers and one resonator. The embodiment of the silencer 100 of FIGS. 3A and 3B includes three expansion chambers, e.g., the first through third expansion chambers 111 through 113 to increase a transmission loss in a limited space of the silencer 100 and. In an embodiment, where the fuel cell system may use a silencer with a relatively lower transmission loss, the silencer 100 may include two expansion chambers as shown in FIGS. 5A and 5B. In such an embodiment, where a number of target frequencies to be reduced again with respect to acoustic noise of air that has passed through the two expansion chambers is one, the silencer 100 may include one resonator as shown in FIGS. 5A and 5B. A volume of a cavity of the resonator of FIGS. 5A and 5B may be adjusted by moving a partition. In an alternative embodiment, where a number of target frequencies to be reduced again with respect to the acoustic noise of the air that has passed through the two expansion chambers is two, two resonators may be installed in the two expansion chambers.

Figure 6A:
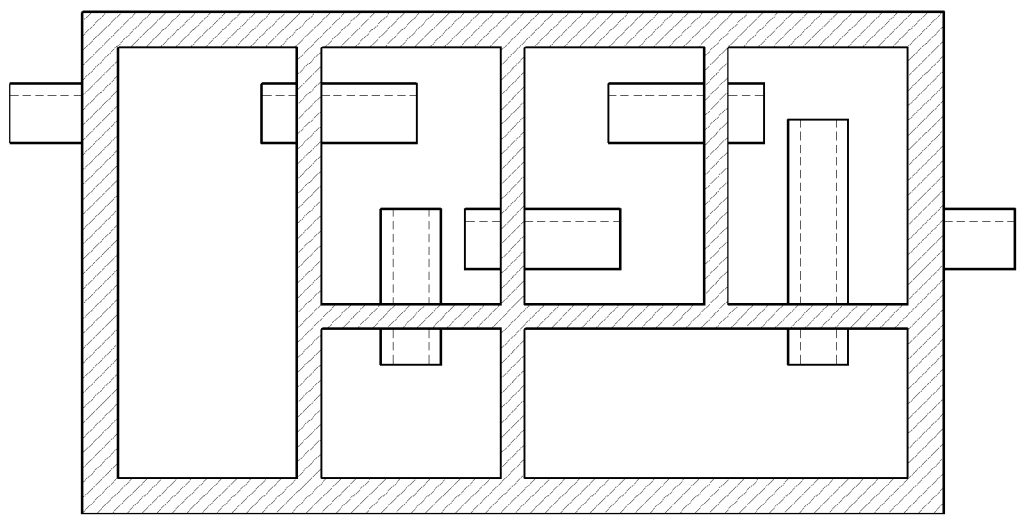
FIGS. 6A and 6B are diagrams of an internal shape of another alternative embodiment of a silencer according to the invention.
Figure 6B:
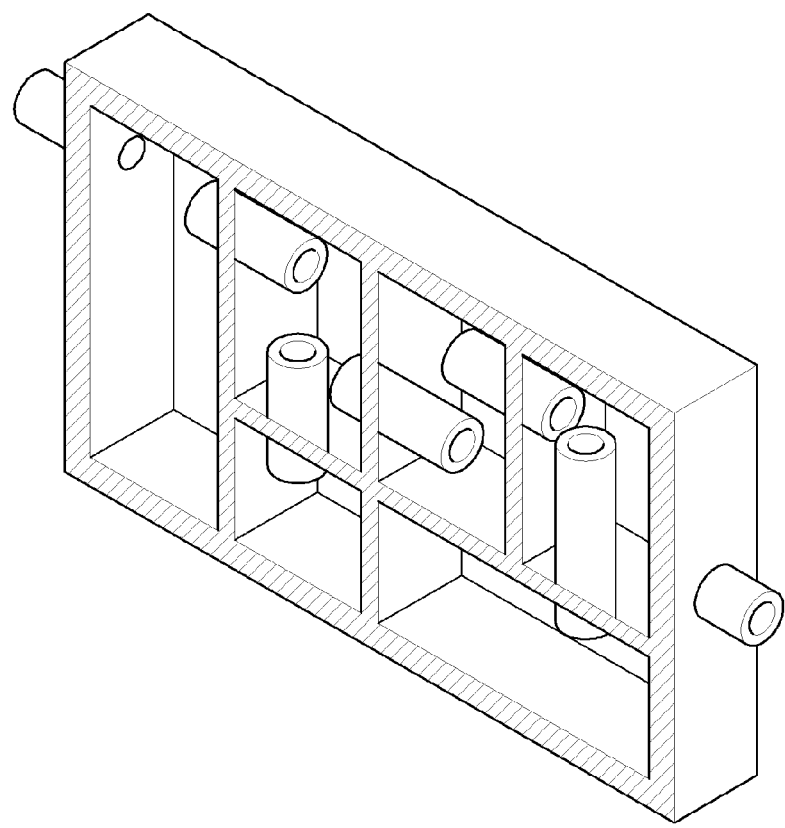

FIGS. 6A and 6B are diagrams of an internal shape of another alternative embodiment of the silencer 100 according to the invention. Referring to FIGS. 6A and 6B, the silencer 100 includes four expansion chambers and two resonators. The silencer 100 of FIGS. 3A and 3B includes three expansion chambers, e.g., the first through third expansion chambers 111 through 113, to increase the transmission loss in a limited space of the silencer 100. In an embodiment, where the fuel cell system uses the silencer 100 with a relatively higher transmission loss, the silencer 100 may include four expansion chambers as shown in FIGS. 6A and 6B. In such an embodiment, to increase the transmission loss, a part of a lower space in the silencer 100 may be assigned as a space of an expansion chamber instead of a cavity of a resonator as shown in FIGS. 5A and 5B. As shown in FIGS. 6A and 6B, the silencer 100 may include two resonators. In an alternative embodiment, where the number of target frequencies to be reduced again with respect to the acoustic noise of the air that passed through the four expansion chambers is three, an additional resonator may be installed in addition to the two resonators shown in FIGS. 6A and 6B.

Figure 7A:
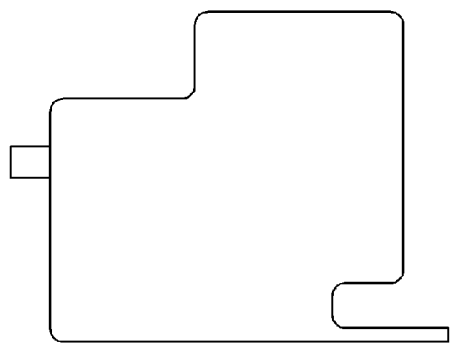
FIGS. 7A through 7D are diagrams of a case of the silencer of FIGS. 3A and 3B.
Figure 7B:
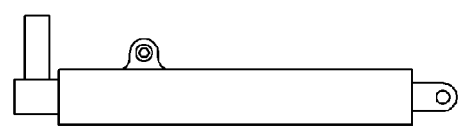
Figure 7C:
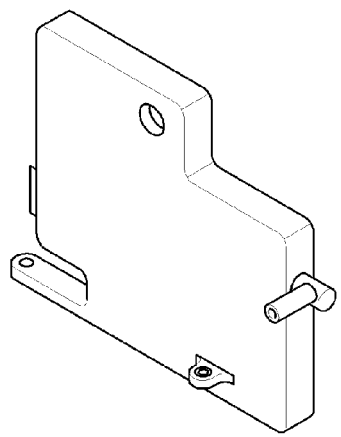
Figure 7D:
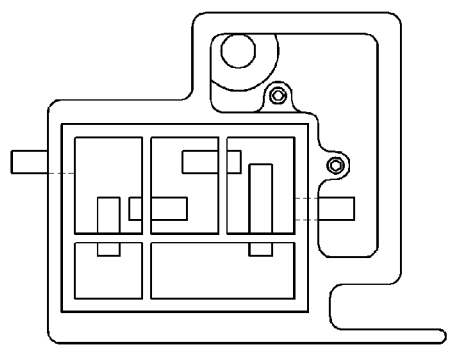

FIGS. 7A through 7D are diagrams of a case of the silencer 100 of FIGS. 3A and 3B. FIG. 7A is a front view of an external shape of the case, FIG. 7B is a top plan view of the external shape of the case, FIG. 7C is a perspective view of the external shape of the case, and FIG. 7D is a lateral view of an internal shape of the case. Referring to FIGS. 7A through 7D, the case of the silencer 100 has a structure to be stably installed inside the fuel cell system of FIG. 1, and includes sockets to be combined to an inner frame for supporting apparatus elements inside the fuel cell system. In an embodiment, the case of the silencer 100 has shape corresponding to an inner shape of the fuel cell system, e.g., a shape of a space assigned to the silencer 100.

Figure 8:
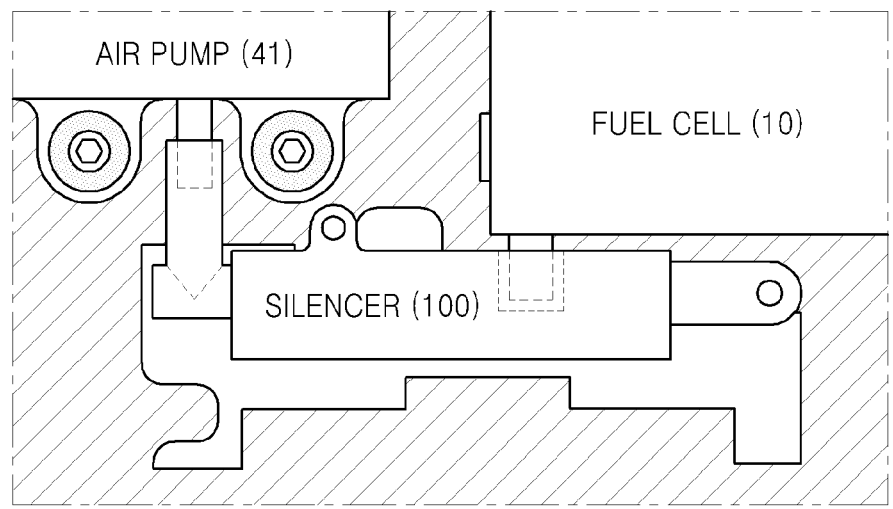
FIG. 8 is a block diagram showing an embodiment of a fuel cell system including a case of FIGS. 7A through 7D in which a silencer is installed.

FIG. 8 is a diagram showing an embodiment of a fuel cell system including the case of FIGS. 7A through 7D in which the silencer 100 is installed. Referring to FIG. 8, the outlet of the air pump 41 and the inlet pipe 1110 of the silencer 100 are coupled to each other, and the inlet at the cathode of the fuel cell 10 and the outlet pipe 1130 of the silencer 100 are coupled to each other. In an embodiment, as shown in FIG. 8, the outlet of the air pump 41 is inserted into the inlet pipe 1110 of the silencer 100. In an embodiment, the inlet at the cathode of the fuel cell 10 is inserted into the outlet pipe 1130 of the silencer 100. As shown in FIG. 8, the sockets of the case of the silencer 100 are coupled to the inner frame of the fuel cell system, and thus the silencer 100 is fixed inside the fuel cell system.

Figure 9:
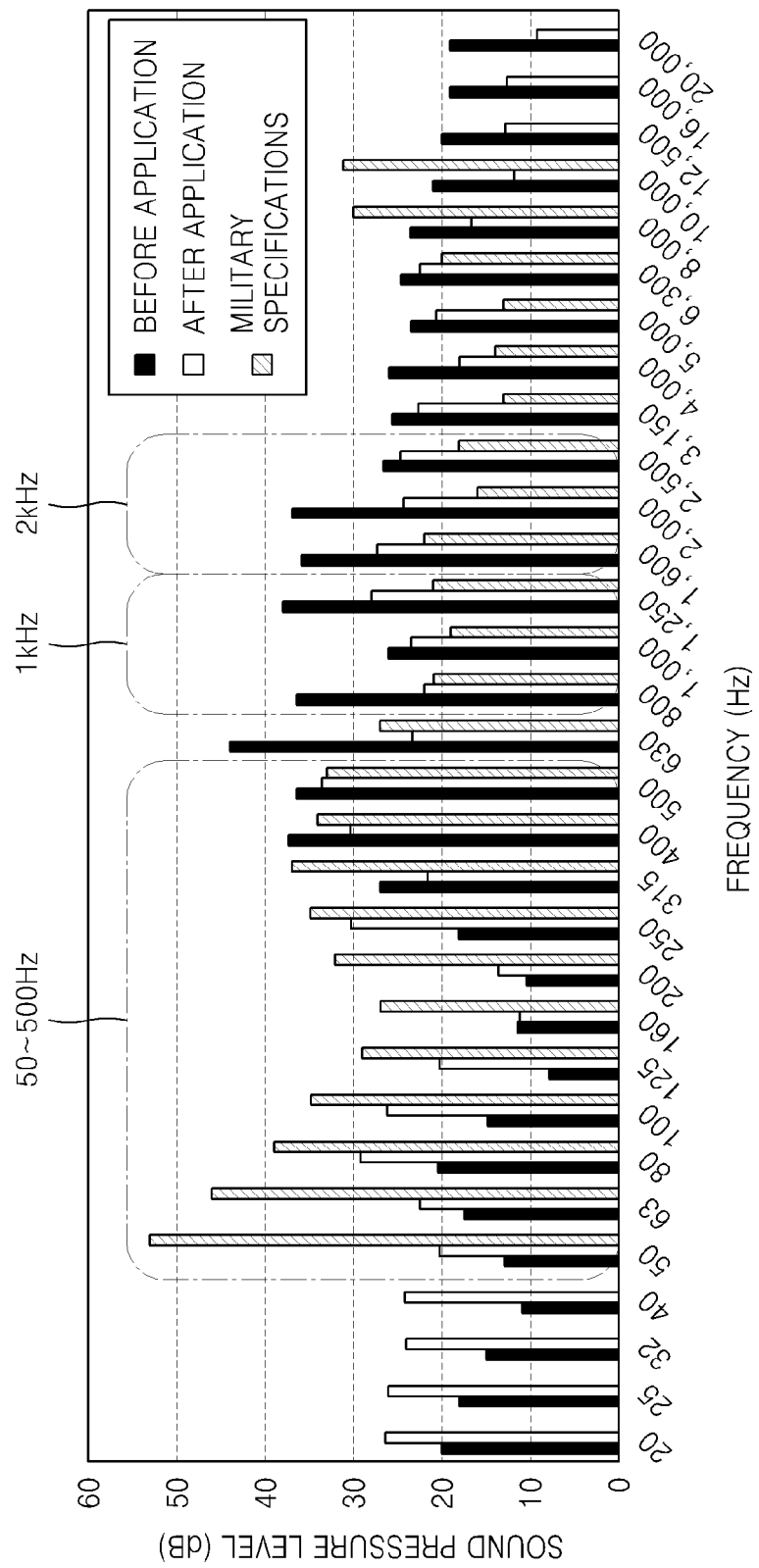
FIG. 9 is a graph showing a result of measuring acoustic noise before and after using the silencer of FIGS. 3A and 3B.

FIG. 9 is a graph showing a result of measuring acoustic noise before and after using the silencer 100 of FIGS. 3A and 3B. Acoustic noise of a fuel cell system is measured at a point about 10 meters (m) away from the fuel cell system, and sound pressure levels detected in an ⅓ octave band unit in a frequency band from about 20 Hz to about 20 kHz from the measured acoustic noise are shown in FIG. 9. As described above, military specifications allow acoustic noise lower than or equal to a predetermined sound pressure level in a ⅓ octave band unit in a frequency band from about 50 Hz to about 10 kHz at a point about 10 m away from a military apparatus. Referring to FIG. 9, three pairs of bars are shown for each frequency in a ⅓ octave band in the frequency band from about 50 Hz to about 10 kHz. From among the three pairs of bars, a left bar shows acoustic noise measured before the silencer 100 is applied to the fuel cell system, a middle bar shows acoustic noise measured after the silencer 100 is applied to the fuel cell system, and a right bar shows a sound pressure level according to military specifications.

As shown in FIG. 9, acoustic noise of the fuel cell system before the silencer 100 is installed satisfies an acoustic noise condition of military specifications in a frequency band from about 50 Hz to about 500 Hz, but does not satisfy the acoustic noise condition in a frequency band from about 500 Hz to about 10 kHz. Specifically, since sound pressure levels of the acoustic noise of the fuel cell system in a low frequency band near about 50 Hz are substantially small compared to sound pressure levels of military specifications, military specifications may be satisfied even if the sound pressure levels somewhat increase in this low frequency band. As described above, the first through third expansion chambers 111 through 113 of the silencer 100 of FIGS. 3A and 3B have a high acoustic noise reduction performance with respect to the acoustic noise in the frequency band after about 1.5 kHz, but have a low acoustic noise reduction performance with respect to the acoustic noise in the frequency band from about 500 Hz to about 1.5 kHz. As such, a plurality of expansion chambers, e.g., the first through third expansion chambers 111 through 113, are employed in an embodiment of a fuel cell system such that military specifications is satisfied by increasing the acoustic noise reduction performance in the frequency band after about 1.5 kHz and sacrificing the acoustic noise reduction performance in the frequency band from about 500 Hz to about 1.5 kHz.

Also, as described above, since the acoustic noise condition of military specifications is not satisfied only by using the first through third expansion chambers 111 through 113, the first resonator 211 having the resonant frequency of about 2 kHz and the second resonator 212 having the resonant frequency of about 1 kHz are employed in an embodiment of the fuel cell system. As shown in FIG. 9, the sound pressure level in the frequency band from about 1400 Hz to about 2600 Hz of around about 2 kHz is reduced by the first resonator 211, and the sound pressure level in the frequency band from about 700 Hz to about 1300 Hz of around about 1 kHz is reduced by the second resonator 212.

In an embodiment, the acoustic noise condition of military specifications may not be completely satisfied by using the first through third expansion chambers 111 through 113 and the first and second resonators 211 and 212 described above. As shown in FIG. 9, the sound pressure levels in the frequency band from about 500 Hz to about 2.5 kHz are substantially reduced by using the silencer 100 of FIGS. 3A and 3B, but there are some frequency bands that still do not satisfy the acoustic noise condition of military specifications. In an alternative embodiment, the fuel cell system may further include an acoustic noise reducing means other than the silencer 100 of FIGS. 3A and 3B. In one embodiment, for example, acoustic noise generated by self-vibration of the air pump 41 may be reduced using an installation method of the air pump 41.

Figure 10A:
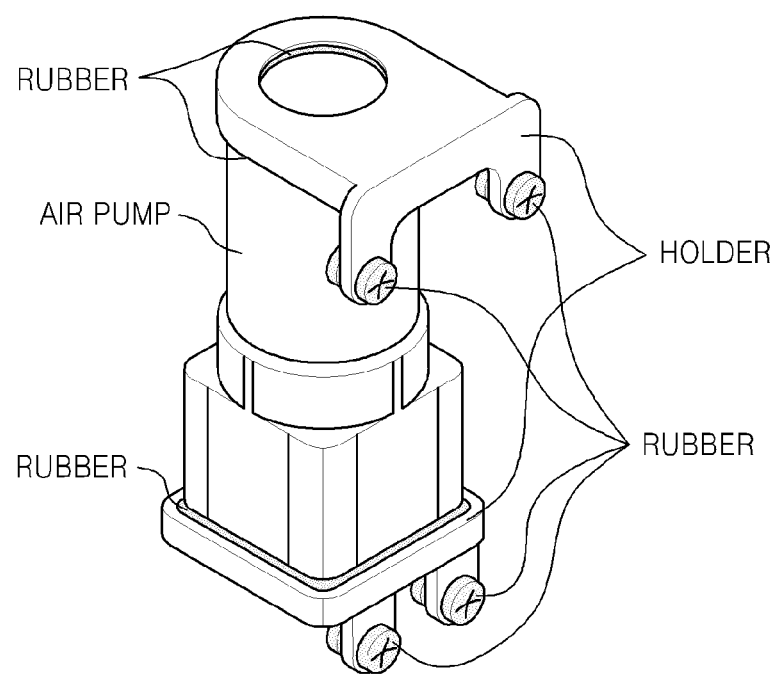
FIGS. 10A and 10B are diagrams showing an embodiment of an installation method of an air pump of FIG. 1.
Figure 10B:
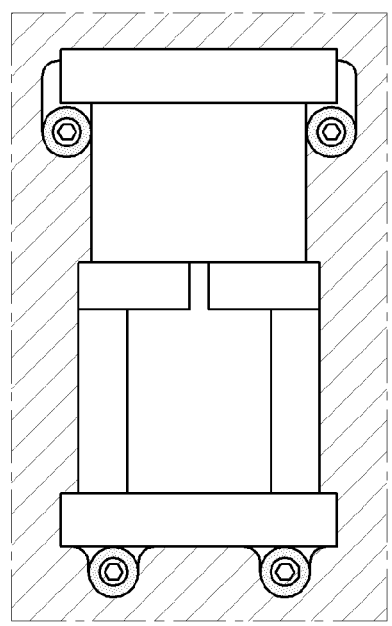

FIGS. 10A and 10B are diagrams showing an embodiment of an installation method of the air pump 41 of FIG. 1. FIG. 10A shows the air pump 41 and holders integrally combined to the air pump 41. FIG. 10B shows the air pump 41 installed in the inner frame of the fuel cell system. As shown in FIG. 10A, the holders for installing the air pump 41 in the fuel cell system are combined to the top and bottom of the air pump 41. The holder combined to the top of the air pump 41 includes two sockets to be combined to the inner frame of the fuel cell system. Similarly, the holder combined to the bottom of the air pump 41 includes two sockets to be combined to the inner frame of the fuel cell system. In such an embodiment, rubber packing having a cylindrical shape and having an X-shaped crack is pressed into a center of each socket to reduce acoustic noise generated by self-vibration of the air pump 41.

Referring to FIG. 10A, rubber packing having a ring shape is disposed, e.g., inserted, between the air pump 41 and the holders of the air pump 41 to reduce the acoustic noise generated by the self-vibration of the air pump 41. Referring to FIG. 10B, rubber packing having a cylindrical shape is disposed, e.g., inserted, between the holders of the air pump 41 and the inner frame of the fuel cell system. By fastening a bolt and a nut through the crack of the rubber packing pressed into each socket of the holder, the holders of the air pump 41 may be installed in the inner frame of the fuel cell system.

In such an embodiment a hardness of the rubber packing between the air pump 41 and the holder of the air pump 41 may be higher than a hardness of the rubber packing between the holder of the air pump 41 and the inner frame of the fuel cell system. In one embodiment, for example, the hardness of the rubber packing between the air pump 41 and the holder of the air pump 41 may be about 70%, and the hardness of the rubber packing between the holder of the air pump 41 and the inner frame of the fuel cell system may be about 30%. The air pump 41 and the holder of the air pump 41 may be integrally combined to fix the air pump 41. Accordingly, rubber packing having a higher hardness may be disposed, e.g., inserted, between the air pump 41 and the holder of the air pump 41. In such an embodiment, since the holder of the air pump 41 and the inner frame of the fuel cell system are combined by fastening the bolt and the nut through the crack of the rubber packing pressed to the socket, the rubber packing does not affect the fixing of the air pump 41 even if the hardness is low. Accordingly, the rubber packing having a lower hardness may be disposed, e.g., inserted, between the holder of the air pump 41 and the inner frame of the fuel cell system to substantially reduce vibration of the air pump 41.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A silencer installed in a fuel cell system, the silencer comprising:
   a plurality of expansion chambers connected to a predetermined apparatus of the fuel cell system, wherein the plurality of expansion chambers serially reduces acoustic noise of air discharged from the predetermined apparatus; and
   a resonator connected to an expansion chamber of the plurality of expansion chambers, wherein the resonator reduces acoustic noise received from the expansion chamber in another frequency band, which is different from a frequency band of the acoustic noise reduced by the plurality of expansion chambers,
   wherein one of the plurality of expansion chambers comprises an inlet pipe which receives air from the predetermined apparatus,
   wherein another of the plurality of expansion chambers comprises an outlet pipe which discharges air flowed into the plurality of expansion chambers, and
   wherein an intermediate pipe is disposed between the plurality of expansion chambers.

2. The silencer of claim 1, wherein
   the plurality of expansion chambers and a cavity of the resonator are defined by a plurality of partitions which divides an inner space of the silencer.

3. The silencer of claim 2, wherein
- a cavity of a first resonator of the resonator shares the plurality of partitions with a first group of the plurality of expansion chambers,
- a cavity of a second resonator of the resonator shares the plurality of partitions with a second group of the plurality of expansion chambers, and
- a number of the plurality of expansion chambers in the second group is greater than a number of at least one expansion chamber in the first group.

4. The silencer of claim 1, wherein a number of the plurality of partitions is substantially proportional to a sum of a number of the plurality of expansion chambers and a number of the cavity of the resonator.

5. The silencer of claim 2, wherein a volume of the cavity is substantially inversely proportional to a size of a center frequency of the another frequency band.

6. The silencer of claim 2, wherein
- a first intermediate pipe extends through a first partition between a first expansion chamber and a second expansion chamber of the plurality of expansion chambers,
- a second intermediate pipe extends through a second partition between the second expansion chamber and a third expansion chamber of the plurality of expansion chambers,
- an end of an outlet of the first intermediate pipe is disposed closer to the second partition than an end of an inlet of the second intermediate pipe such that air discharged from the outlet of the first intermediate pipe into the second expansion chamber flows into the inlet of the second intermediate pipe in a backflow form.

7. The silencer of claim 1, wherein
a neck of the resonator protrudes into the expansion chamber of the plurality of expansion chambers connected to the resonator such that internal air of the expansion chamber connected to the resonator flows into a hole of the neck of the resonator and the air flowed into the hole of the neck of the resonator is discharged into the expansion chamber connected to the resonator from the hole of the neck of the resonator.

8. The silencer of claim 2, wherein
- a length of a neck of the resonator is substantially inversely proportional to a size of a center frequency of the another frequency band which is different from the frequency band of the acoustic noise reduced by the plurality of expansion chambers, and
- a size of a cross-section of the neck of the resonator is substantially proportional to the size of the center frequency of the another frequency band which is different from the frequency band of the acoustic noise reduced by the plurality of expansion chambers.

9. The silencer of claim 1, wherein
- the predetermined apparatus is an air pump which supplies air to a fuel cell of the fuel cell system, and
- the outlet pipe is connected to an inlet at a cathode of the fuel cell of the fuel cell system such that air discharged from the outlet pipe flows into the inlet at the cathode of the fuel cell.

* * * * *